(12) United States Patent
Taylor et al.

(10) Patent No.: US 9,082,102 B2
(45) Date of Patent: Jul. 14, 2015

(54) SYSTEM AND METHOD FOR REMOTE EQUIPMENT DATA MANAGEMENT

(75) Inventors: Brandon C. Taylor, Frisco, TX (US); Jason A. Wible, Plano, TX (US); James S. MacLean, III, Coppell, TX (US)

(73) Assignee: GEOFORCE, INC., Lewisville, TX (US)

( * ) Notice: Subject to any disclaimer, the term of this patent is extended or adjusted under 35 U.S.C. 154(b) by 16 days.

(21) Appl. No.: 13/443,118

(22) Filed: Apr. 10, 2012

(65) Prior Publication Data

US 2013/0264382 A1    Oct. 10, 2013

(51) Int. Cl.
G06F 19/00 (2011.01)
G06Q 10/08 (2012.01)
G01S 5/02 (2010.01)

(52) U.S. Cl.
CPC ............ G06Q 10/087 (2013.01); G01S 5/0205 (2013.01)

(58) Field of Classification Search
USPC .................................. 235/375, 385, 487, 494
See application file for complete search history.

(56) References Cited

U.S. PATENT DOCUMENTS

| | | | |
|---|---|---|---|
| 3,573,817 A | 4/1971 | Akers | |
| 4,977,577 A | 12/1990 | Arthur et al. | |
| 5,151,684 A | 9/1992 | Johnsen | |
| 5,380,994 A * | 1/1995 | Ray | 235/462.45 |
| 5,386,084 A | 1/1995 | Risko | |
| 5,479,441 A | 12/1995 | Tymes et al. | |
| 5,668,803 A | 9/1997 | Tymes et al. | |
| 5,686,888 A | 11/1997 | Welles, II et al. | |
| 5,774,876 A | 6/1998 | Woolley et al. | |
| 5,835,377 A * | 11/1998 | Bush | 700/99 |
| 5,920,589 A | 7/1999 | Rouquette et al. | |
| 5,987,058 A | 11/1999 | Sanderford et al. | |
| 5,999,561 A | 12/1999 | Naden et al. | |
| 6,216,087 B1 | 4/2001 | Want et al. | |
| 6,292,108 B1 | 9/2001 | Straser et al. | |
| 6,639,939 B1 | 10/2003 | Naden et al. | |
| 6,830,181 B1 * | 12/2004 | Bennett | 235/440 |
| 6,847,892 B2 * | 1/2005 | Zhou et al. | 701/408 |
| 6,851,611 B1 * | 2/2005 | Shaw-Sinclair | 235/472.01 |
| 6,965,314 B2 | 11/2005 | Bohinc, Jr. | |
| 6,974,078 B1 * | 12/2005 | Simon | 235/383 |
| 7,009,530 B2 | 3/2006 | Zigdon et al. | |
| 7,040,532 B1 * | 5/2006 | Taylor et al. | 235/375 |
| 7,072,320 B2 | 7/2006 | Filho | |
| 7,098,784 B2 | 8/2006 | Easley et al. | |
| 7,099,770 B2 | 8/2006 | Naden et al. | |
| 7,187,278 B2 * | 3/2007 | Biffar | 340/539.13 |

(Continued)

FOREIGN PATENT DOCUMENTS

WO    WO 2011038018 A1    3/2011

OTHER PUBLICATIONS

"Globalstar MMT Wireless Tracker", www.globalstar.com, 2010, 1 page.

(Continued)

*Primary Examiner* — Paultep Savusdiphol

(57) ABSTRACT

A global tracking device includes a hardened case configured to be removably coupled to an object. The hardened case includes a barcode associated with information regarding the object. The data access element is configured to cause an external device to populate an interactive display application containing at least a portion of the information regarding to the object. The global tracking device can communicate with a central facility via a satellite communication.

18 Claims, 9 Drawing Sheets

(56) References Cited

U.S. PATENT DOCUMENTS

| | | |
|---|---|---|
| 7,190,265 B1 | 3/2007 | Bohinc, Jr. |
| 7,262,685 B2 * | 8/2007 | Bastian, II ............ 340/5.92 |
| 7,315,281 B2 | 1/2008 | Dejanovic et al. |
| 7,327,262 B2 * | 2/2008 | Motteram et al. ........ 340/572.1 |
| 7,337,061 B2 | 2/2008 | Naden et al. |
| 7,384,380 B2 | 6/2008 | Reinbold et al. |
| 7,405,655 B2 | 7/2008 | Ng et al. |
| 7,477,694 B2 | 1/2009 | Sanderford, Jr. et al. |
| 7,558,312 B2 | 7/2009 | Cheng et al. |
| 7,593,456 B2 | 9/2009 | Sailaja et al. |
| 7,620,098 B2 | 11/2009 | Hong et al. |
| 7,623,029 B2 | 11/2009 | Meyers |
| 7,672,781 B2 | 3/2010 | Churchill et al. |
| 7,683,270 B2 | 3/2010 | Fernandez et al. |
| 7,693,530 B1 | 4/2010 | McKinney et al. |
| 7,705,777 B2 | 4/2010 | Sanderford, Jr. et al. |
| 7,895,131 B2 | 2/2011 | Kraft |
| 7,928,844 B2 | 4/2011 | Mackenzie et al. |
| 7,932,827 B2 | 4/2011 | Chand et al. |
| 7,978,065 B2 | 7/2011 | Schnitz et al. |
| 7,994,917 B2 * | 8/2011 | Hirota et al. ............ 340/572.1 |
| 8,004,387 B2 | 8/2011 | Childress et al. |
| 8,004,397 B2 | 8/2011 | Forrest et al. |
| 8,014,439 B2 | 9/2011 | Sakamoto et al. |
| 8,126,680 B2 | 2/2012 | Troxler et al. |
| 8,159,329 B1 * | 4/2012 | Killian et al. ............ 340/8.1 |
| 8,223,009 B2 | 7/2012 | Anderson et al. |
| 8,237,575 B2 | 8/2012 | MacLean, III et al. |
| 8,239,169 B2 * | 8/2012 | Gregory et al. ............ 702/187 |
| 8,837,447 B2 | 9/2014 | Twitchell, Jr. |
| 2002/0038267 A1 | 3/2002 | Can et al. |
| 2003/0087631 A1 | 5/2003 | Diachina et al. |
| 2003/0149526 A1 * | 8/2003 | Zhou et al. ............ 701/213 |
| 2004/0124977 A1 * | 7/2004 | Biffar ............ 340/539.13 |
| 2004/0147220 A1 | 7/2004 | Vaddiparty et al. |
| 2004/0157597 A1 | 8/2004 | Comer et al. |
| 2004/0212499 A1 | 10/2004 | Bohinc, Jr. |
| 2005/0113107 A1 | 5/2005 | Meunier |
| 2005/0140498 A1 * | 6/2005 | Bastian, II ............ 340/5.92 |
| 2005/0171696 A1 | 8/2005 | Naden et al. |
| 2005/0250440 A1 * | 11/2005 | Zhou et al. ............ 455/12.1 |
| 2006/0007006 A1 | 1/2006 | Alioto et al. |
| 2006/0011716 A1 * | 1/2006 | Perkowski ............ 235/375 |
| 2006/0059964 A1 * | 3/2006 | Bass et al. ............ 70/408 |
| 2006/0113370 A1 * | 6/2006 | Taylor et al. ............ 235/375 |
| 2006/0113374 A1 * | 6/2006 | Taylor et al. ............ 235/376 |
| 2006/0221363 A1 * | 10/2006 | Roth et al. ............ 358/1.6 |
| 2007/0222595 A1 * | 9/2007 | Motteram et al. ........ 340/572.1 |
| 2008/0001748 A1 | 1/2008 | Childress et al. |
| 2008/0030330 A1 | 2/2008 | Vock et al. |
| 2008/0042842 A1 | 2/2008 | Ulibarri |
| 2008/0051033 A1 | 2/2008 | Hymes |
| 2008/0186166 A1 * | 8/2008 | Zhou et al. ............ 340/539.13 |
| 2008/0198905 A1 | 8/2008 | Zhu et al. |
| 2008/0221930 A1 * | 9/2008 | Wekell et al. ............ 705/3 |
| 2008/0266131 A1 | 10/2008 | Richardson et al. |
| 2009/0051490 A1 | 2/2009 | Childress et al. |
| 2009/0109040 A1 | 4/2009 | MacLean, III et al. |
| 2009/0117880 A1 | 5/2009 | Sipher |
| 2009/0322510 A1 | 12/2009 | Berger et al. |
| 2010/0016022 A1 | 1/2010 | Liu et al. |
| 2010/0038417 A1 * | 2/2010 | Blankitny ............ 235/375 |
| 2010/0137148 A1 | 6/2010 | Kaye |
| 2010/0151955 A1 | 6/2010 | Holden |
| 2010/0171611 A1 | 7/2010 | Gao et al. |
| 2010/0224783 A1 | 9/2010 | Frank |
| 2010/0258618 A1 * | 10/2010 | Philbrick et al. ............ 235/375 |
| 2010/0312833 A1 | 12/2010 | Rimmer et al. |
| 2010/0314456 A1 | 12/2010 | Hartwig et al. |
| 2011/0004444 A1 | 1/2011 | Farrow et al. |
| 2011/0017693 A1 | 1/2011 | Thomas et al. |
| 2011/0018418 A1 | 1/2011 | Yoo |
| 2011/0050424 A1 | 3/2011 | Cova et al. |
| 2011/0066398 A1 | 3/2011 | Troxler et al. |
| 2011/0074629 A1 | 3/2011 | Khan et al. |
| 2011/0079652 A1 * | 4/2011 | Bass et al. ............ 235/492 |
| 2011/0112979 A1 | 5/2011 | Holsen et al. |
| 2011/0155920 A1 | 6/2011 | Hupont et al. |
| 2012/0037697 A1 * | 2/2012 | Boone et al. ............ 235/375 |
| 2012/0084182 A1 * | 4/2012 | Bass et al. ............ 705/28 |
| 2012/0087355 A1 | 4/2012 | Wentink |

OTHER PUBLICATIONS

"Globalstar SMARTTONE Satellite Managed Asset Ready Tracker", www.globalstar.com, 2010, 1 page.

"SmartOne LP, Satellite-Manged Asset-Ready Tracker", www.globalstar.com, 2011, 2 pages.

Jason A. Wible, et al., "Location Tracking With Integrated Identification of Cargo Carrier Contents and Related System and Method", U.S. Appl. No. 13/443,841, filed Apr. 10, 2012.

Jason A. Wible, et al., "Apparatus and Method for Radio Frequency Silencing in Oil and Gas Operations, Excavation Sites, and Other Environments", U.S. Appl. No. 13/443,097, filed Apr. 10, 2012.

Brandon C. Taylor, et al., "System and Method for Remote Cargo Tracking", U.S. Appl. No. 13/443,201, filed Apr. 10, 2012.

Office Action dated Oct. 11, 2013 in connection with U.S. Appl. No. 13/443,841.

Office Action dated Oct. 6, 2010 in connection with U.S. Appl. No. 12/288,909.

Office Action dated Feb. 7, 2011 in connection with U.S. Appl. No. 12/288,909.

Office Action dated Jun. 10, 2011 in connection with U.S. Appl. No. 12/288,909.

Office Action dated Sep. 20, 2012 in connection with U.S. Appl. No. 13/479,005.

Office Action dated Oct. 26, 2012 in connection with U.S. Appl. No. 13/443,097.

Office Action dated Mar. 7, 2013 in connection with U.S. Appl. No. 13/479,005.

Office Action dated Apr. 12, 2013 in connection with U.S. Appl. No. 13/443,097.

Office Action dated Sep. 20, 2013 in connection with U.S. Appl. No. 13/443,819.

Office Action dated Nov. 20, 2013 in connection with U.S. Appl. No. 13/443,097.

Office Action dated Jan. 30, 2014 in connection with U.S. Appl. No. 13/443,819.

Office Action dated Apr. 24, 2014 in connection with U.S. Appl. No. 13/443,097.

Office Action dated May 22, 2014 in connection with U.S. Appl. No. 13/443,841.

Office Action dated May 28, 2014 in connection with U.S. Appl. No. 13/443,819.

Office Action dated Oct. 1, 2014 in connection with U.S. Appl. No. 13/443,819; 23 pp.

Office Action dated Aug. 5, 2014 in connection with U.S. Appl. No. 13/443,097; 18 pp.

U.S. Office Action dated Nov. 13, 2014 in connection with U.S. Appl. No. 13/443,841; 28 pp.

U.S. Office Action dated Jan. 23, 2015 in connection with U.S. Appl. No. 13/443,201; 19 pp.

U.S. Office Action dated Feb. 4, 2015 in connection with U.S. Appl. No. 13/443,097; 14 pp.

\* cited by examiner

SYSTEM AND METHOD FOR REMOTE EQUIPMENT DATA MANAGEMENT

TECHNICAL FIELD

This disclosure relates generally to tracking systems and, more specifically, to a system and method for remote cargo data reporting.

BACKGROUND

Many exploration and production operations, such as oil and gas operations, are supplied by supply chains that use various types of containers like tanks, boxes, and pallets. Many of these containers are tracked at certain points along a supply chain. However, full visibility into a supply chain is often limited. For example, a supply inventory in a container is often unknown. These supplies vary from "rope, soap and dope" (which may be tracked for manifesting purposes) to valuable drilling equipment, such as downhole tools, drilling collars, formation evaluation tools, and core samples. Some containers may also include hazardous materials or other materials that have regulatory requirements.

SUMMARY

This disclosure provides a system and method for remote cargo tracking.

In a first embodiment, an apparatus includes a hardened case configured to be removably coupled to an object and a control unit disposed within the hardened case. The hardened case includes a data access element associated with information regarding the object. The data access element is configured to cause an external device to populate a an interactive display application containing at least a portion of the information regarding to the object.

In a second embodiment, a system includes a global tracking device configured to couple to an object. The global tracking device includes a hardened case configured to be removably coupled to the object. The hardened case includes a data access element associated with information regarding the object. The system also includes a central facility configured to communicate with the global tracking device via a satellite communication. The data access element is configured to cause an external device to populate an interactive display application containing at least a portion of the information regarding to the object.

In a third embodiment, a method includes associating a tracking device with information regarding an object to which the tracking device is coupled. The method also includes scanning, by an external device, a barcode disposed on a face of the tracking device. The method further includes generating, in response to scanning the barcode, an interactive display application containing the information regarding the asset.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 12, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
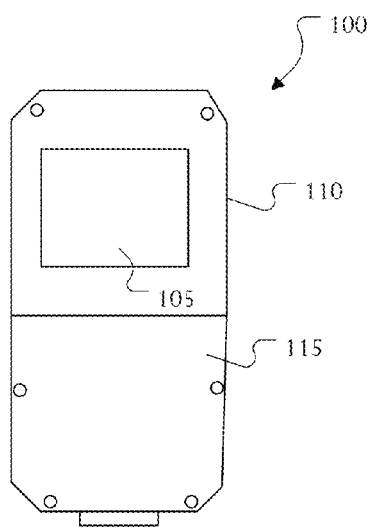
FIG. 1 illustrates a conventional mobile tracker.

FIG. 1 illustrates a conventional mobile tracker (MT) 100. The MT 100 is a wireless device that operates at 2.4 GHz Radio Frequency (RF) for programming of the MT 100. The MT 100 can be configured to enable an operator to extract data or change reporting parameters on the device or a group of devices using a wireless laptop or PDA handheld device. The MT 100 is configured to transmit data to a central facility via a satellite communication.

The MT 100 includes processing circuitry contained within a plastic housing 110. The MT 100 is configured to removably couple to an external battery pack 115. The battery pack 115 includes an energy storage source (such as a battery) contained within a plastic case.

In this example, the plastic housing 110 is not rugged, nor is it designed for harsh environments. Accordingly, the MT 100 may be susceptible to damage from extreme temperatures, shock (such as from falling or collisions), and weather. The plastic housing 110 can crack while in use or even prior to use, resulting in water entering into the plastic housing 110 and contaminating the processing circuitry 105.

Figure 2:
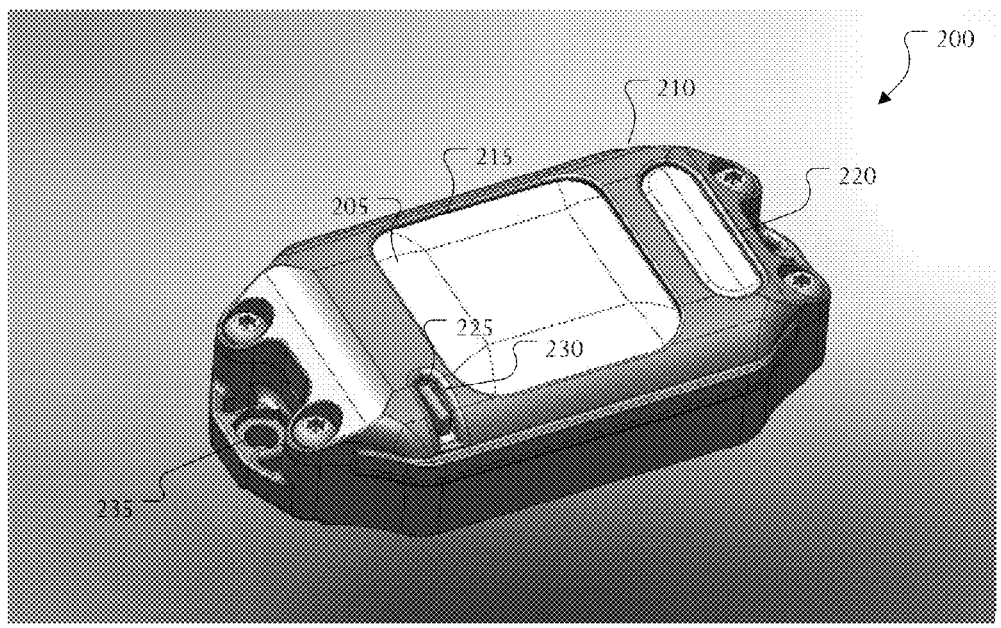
FIG. 2 illustrates an example global tracking device according to this disclosure.

FIG. 2 illustrates an example global tracking device (GTD) 200 according to this disclosure. As shown in FIG. 2, the GTD 200 includes a control unit 205 and a hardened case 210. The hardened case 210 is configured to protect the control unit 205 during deployment in the field. The hardened case 210 can be formed from any suitable material(s), such as a zinc alloy, steel, or other suitable material. In some embodiments, the material used to form the hardened case 210 is anti-magnetic and/or non-sparking. The hardened case 210 inhibits damage to the control unit 205, such as by helping to prevent damage from compression, impact, and weather. As a specific example, the hardened case 210 can prevent water or other liquids from contacting or entering into the control unit 205. In some embodiments, the GTD 200 includes at least two layers of seals configured to protect processing circuitry and a power source contained within the control unit 205.

In this example, the hardened case 210 includes a first window 215 configured to allow transmission of wireless signals to and from the control unit 205. The wireless signals can include long-range RF signals, such as cellular wireless signals or satellite communication signals. The first window 215 is also configured to protect the control unit 205 from electro-static interference (ESI). In this example, the first window 215 is dimensioned to enable part of the control unit 205 to extend into the first window 215. In some embodiments, the portion of the control unit 205 that extends into the first window 215 can extend beyond a planar level of a surface of the hardened case 210. In addition, the first window 215 can be dimensioned to help focus wireless signals towards a transceiver in the control unit 205. For example, the first window 215 can be dimensioned so that a metal edge of the first window 215 is disposed at a specified angle in relation to a location of the transceiver. In some embodiments, the metal edge of the first window 215 is disposed at an angle of about 28° from the transceiver.

The hardened case 210 also includes a second window 220 configured to allow transmission of local wireless signals to and from the control unit 205. The local wireless signals can include BLUETOOTH, BLUETOOTH LOW ENERGY (BLE), WiFi, ZIGBEE, Radio Frequency identification (RFID), or other signals. The second window 220 also protects the control unit 205 from ESI. In this example, the second window 220 is dimensioned to enable part of the control unit 205 to extend into the second window 220. In some embodiments, the portion of the control unit 205 that extends into the second window 220 can extend beyond a planar level of a surface of the hardened case 210.

The GTD 200 further includes a switch 225 that enables an operator to activate or deactivate the GTD 200. The switch 225 here extends through a third window 230 in the hardened case 210. The switch 225 can be coupled to the processing circuitry or other components within the control unit 205. The switch 225 represents any suitable type of switch, such as a magnetic switch.

The GTD 200 is adapted to be removably mounted to a container or other structure. For example, the GTD 200 can include a mounting mechanism for attaching the GTD 200 to a number of different types of containers, tools, equipment, or machinery. For example, the GTD 200 can be mounted using one or more hex-head screws, socket-head cap screws, hex-head self-tapping screws, Phillips-head self tapping screws, stainless steel banding straps, zip-ties, VHB tape, and/or magnetic mountings. As a particular example, the hardened case 210 can include a number of openings 235 configured to receive screws, such as hex-head screws or socket-head cap screws. The GTD 200 can also be mounted via a standard mounting, a flush mounting, or some other mounting technique.

Figure 3:
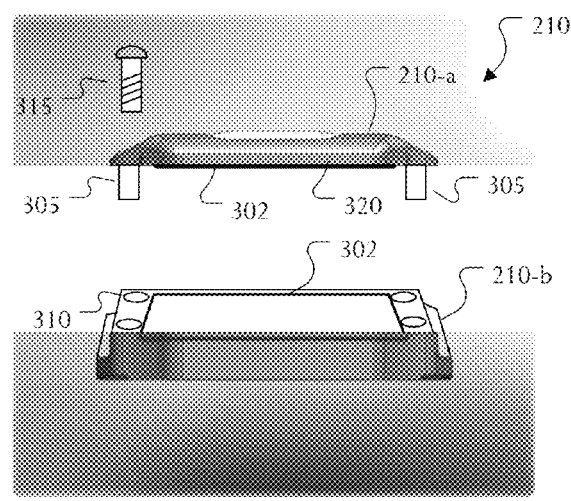
FIG. 3 illustrates an example hardened case for a global tracking device according to this disclosure.

FIG. 3 illustrates an example hardened case 210 for a global tracking device 200 according to this disclosure. As shown in FIG. 3, the hardened case 210 is configured to protect processing circuitry in the control unit 205 and a power source for the processing circuitry. In some embodiments, the hardened case 210 and the processing circuitry in the control unit 205 can be configured to have a limited lump capacitance. Also, in some embodiments, the hardened case 210 is configured to be certified for powered devices operating within explosive environments. Example certifications could include European ATEX and/or International Electro-technical (IEC-WO029-0).

In the example shown in FIG. 3, the hardened case 210 has a modular construction. The hardened case 210 here includes a top portion 210-*a* and a bottom portion 210-*b*. When coupled together, the top portion 210-*a* and the bottom portion 210-*b* are configured to form a water-tight seal around the control unit 205. For example, the top portion 210-*a* and the bottom portion 210-*b* can include interlaced gaskets 302 each having multiple ridges configured to interlace with each other to form the water-tight seal. The gaskets 302 can include any suitable material(s) for forming a seal. The gaskets 302 could, for instance, be formed of a fluorosilicone material or other material(s) resistant to and providing a water-tight seal across a wide temperature range, such as from a low temperature of −40° C. to a high temperature of 85° C. The gaskets 302 can further be configured to absorb changes in section of metal or plastic.

In this example, the top portion 210-*a* also includes multiple support dowels 305, and the bottom portion 210-*b* also includes multiple vias 310. Each via 310 is adapted to receive and couple with a respective support dowel 305. Each via 310 can also include a threaded opening adapted to receive a connector, such as a hex bolt or other bolt 315. A bolt 315 can be inserted through an opening in one of the dowels 305 and coupled with the threaded opening in the via 310. Accordingly, the bolt 315 secures the top portion 210-*a* to the bottom portion 210-*b*. In some embodiments, the opening in one or more support dowels 305 is threaded. The support dowels 305 and vias 310 are configured to form an interlocking structure that protects against a shear load applied to the hardened case 210.

The hardened case 210 further includes reinforcement ridges 320 (also seen in FIG. 2). The reinforcement ridges 320 protrude from at least two sides of the hardened case 210. The reinforcement ridges 320 provide load bearing reinforcement to the hardened case 210. In some embodiments, the top portion 210-*a* includes one part of each reinforcement ridge 320, and the bottom portion 210-*b* includes another part of each reinforcement ridge 320. In other embodiments, either the top portion 210-*a* or the bottom portion 210-*b* includes each reinforcement ridge 320.

Different hardened cases 210 can be dimensioned to have different sizes depending upon specified applications. In some embodiments, one example of a hardened case 210 is dimensioned to be 3.1 inches wide, 6.25 inches long, and 1.41 inches high.

Figure 4:
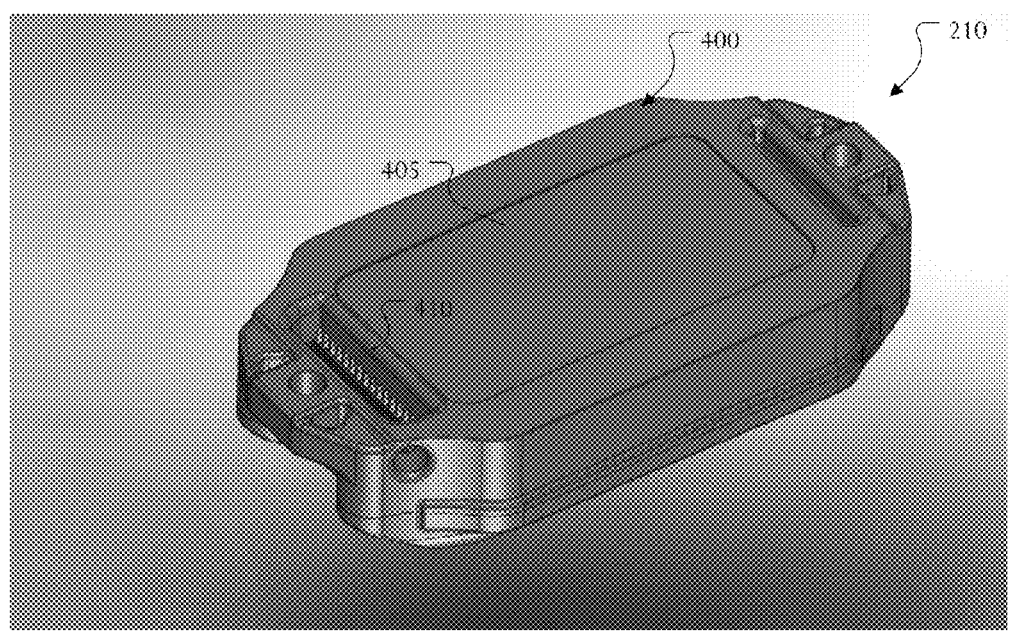
FIG. 4 illustrates an example bottom view of the hardened case according to this disclosure.

FIG. 4 illustrates an example bottom view of the hardened case 210 according to this disclosure. As shown in FIG. 4, the hardened case 210 includes a substantially flat mounting surface 400 (its bottom surface here). In some embodiments, the mounting surface 400 is flat and includes no protrusions or recesses. In other embodiments like the one shown here, the mounting surface 400 includes a recess 405. The recess 405 can be adapted, for example, to receive a mounting mechanism, such as a tape or magnetized source. The mounting surface 400 also includes a fourth window 410, which provides an access point to the control unit 205. For example, the fourth window 410 can be used to upgrade or connect to the control unit 205. The fourth window 410 includes one or more seals for inhibiting the leakage of liquids into the hardened case 210. Note that use of the fourth window 410 can be optional.

Figure 5:
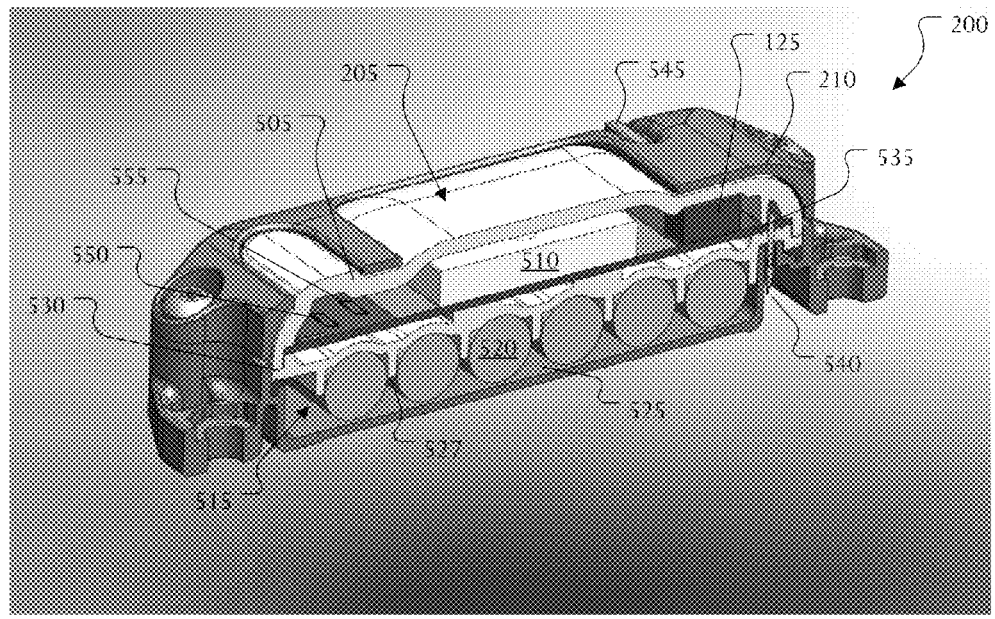
FIG. 5 illustrates an example cross-sectional view of the global tracking device according to this disclosure.

FIG. 5 illustrates an example cross-sectional view of the global tracking device 200 according to this disclosure. As shown in FIG. 5, the GTD 200 includes the control unit 205 protected by the hardened case 210. The control unit 205 here includes a plastic or other encasement 505. The encasement 505 can be molded to conform to an internal shape of the hardened case 210. In some embodiments, the encasement 505 is configured to form a water-tight seal with the internal surfaces of the hardened case 210. The encasement 505 can be a self-contained, sealed compartment that houses processing circuitry 510 and other components of the control unit 205. Accordingly, the combination of the hardened case 210 and the encasement 505 provides two layers of water-tight seals for the GTD 200. In some embodiments, portions of the encasement 505 are configured to extend through one or more windows 215, 220, 230 of the hardened case 210.

The GTD 200 also includes a power source 515, which supplies operating power for the GTD 200. Any suitable power source could be used, such as multiple batteries 520 coupled in series or in parallel. In some embodiments, the power source 515 can include a power converter configured to convert power from an external source for use by the processing circuitry 510 or other components. For example, the power source 515 can include a solar cell converter configured to convert or otherwise redirect electrical power generated by a solar cell into power configured to re-charge the batteries 520 and/or provide power to the processing circuitry 510.

In this example, the batteries 520 are contained within a battery compartment 525. The battery compartment 525 can be formed by a cavity created between the encasement 505 and the bottom portion 210-b of the hardened case 210. For example, the battery compartment 525 can be disposed in a region beneath or otherwise adjacent to a location of the processing circuitry 510 within the encasement 505. The encasement 505 can include a plurality of ribs 527 that are configured to define individual battery seats, as well as to inhibit compression of the control unit 250. Upon opening of the hardened case 210 (such as by removing the bottom portion 210-b), access to the batteries 520 within the battery compartment 525 can be obtained. Accordingly, one or more batteries 520 can be easily replaced by opening the hardened case 210.

The hardened case 210 further includes one or more seals 530 where different portions of the encasement 505 meet. Among other things, these seals 520 help to seal the battery compartment 525. This can also help to seal battery contacts electrically connecting the processing circuitry 510 to the batteries 520 in order to protect against liquids penetrating the control unit 205.

The processing circuitry 510 here is mounted on a circuit board 535, which is contained within the encasement 505. The circuit board 535 in this example includes an external electrical connection 540. The external electrical connection 540 is electrically coupled to the processing circuitry 510 through one or more connections on the circuit board 535. The external electrical connection 540 is also configured to extend through the fourth window 410. The external electrical connection 540 can be used in various ways, such as to communicate with or power the processing circuitry 510 or to couple to an external device. The junction of the external electrical connection 540 and the encasement 505 is configured to maintain the water-tight seal of the encasement 505. That is, the encasement 505 can be in physical contact with or otherwise molded to the external electrical connection 540 so that liquids cannot enter into the encasement 505 at the junction between the encasement 505 and external electrical connection 540.

The processing circuitry 510 is coupled to the switch 125 through one or more connections on the circuit board 535. The switch 125 can be configured, for example, to toggle the processing circuitry 510 from an on state to an off state and vice-versa. As a particular example, the switch 125 can be configured to interrupt or allow power from the power source 515 to be delivered to the processing circuitry 510. A portion 545 of the switch 125 extends through the third window 230 of the hardened case 210.

In addition, the GTD 200 includes transceivers 550-555 configured to communicate through one or more of the windows 215-220. As noted above, the transceivers 550-555 could support any suitable wireless communication protocol(s). For example, the transceiver 550 could represent a BLUETOOTH Low Energy (BLE) transceiver disposed in proximity to the second window 220, and the transceiver 555 could represent an RFID transceiver also disposed in proximity to the second window 220.

Figure 6:
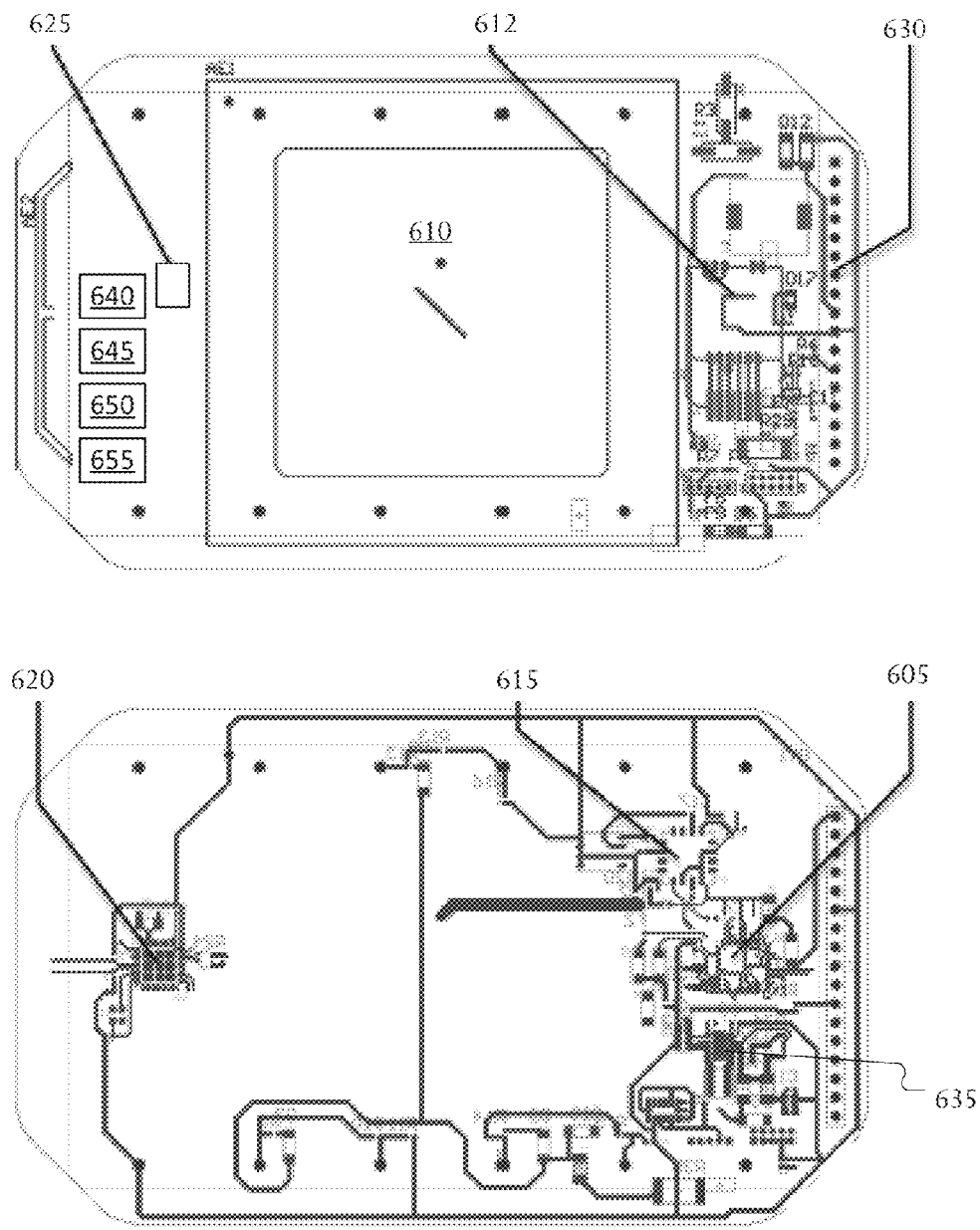
FIG. 6 illustrates an example circuit board in the global tracking device according to this disclosure.

FIG. 6 illustrates an example circuit board 535 in the global tracking device 200 according to this disclosure. As shown in FIG. 6, circuitry is disposed on both sides of the circuit board 535. The circuitry here includes a controller 605 and a long-distance transceiver 610. The transceiver 610 can include an antenna coupled to a modem 612, such as a satellite modem, cellular modem, or other suitable wireless communications modem.

The circuitry also includes a global positioning system (GPS) engine 615, a BLE engine 620, and an RF identifier 625. The RF identifier 625 could be an embedded passive global RFID device. The circuit board 535 further includes various conductive tracings configured to communicatively couple the controller 605 to the transceiver 610, the GPS engine 615, the BLE engine 620 and the RF identifier 625. An expansion header 630 can be coupled to one or more elements on the circuit board 535 through the conductive tracings to provide a connection point for access to the components on the circuit board 535 or for future access. For example, the expansion header 630 can be configured to provide a future use capability for communicating with or powering of the processing circuitry 510 or for coupling to an external device.

The controller 605 is coupled to a memory 635. The memory 635 is configured to store instructions and data used, generated, or collected by the controller 605. The controller 605 is configured to control the functions of the GTD 200. For example, the controller 605 can be configured to control wireless communications sent and received by the transceiver 610 or the BLE engine 620.

In this example, the circuit board 535 further includes multiple sensors. The sensors can include a shock sensor 640, an accelerometer 645, a temperature sensor 650, and a three-dimensional (3D) impact sensor 655. The controller 605 can use the sensors 640-655 in any suitable manner. For example, the controller 605 could use the sensors to determine if the object to which the GTD 200 is attached has been dropped or damaged. Accordingly, the GTD 200 can be configured to initiate event-based maintenance. For instance, the GTD 200 can trigger an alarm indicating that the object to which the GTD 200 is attached may require maintenance due to an impact occurring over a threshold amount, such as an impact three times the force of gravity (3G) in any direction. Moreover, the GTD 200 can store information related to the impact, such as by storing and providing information related to the shock in x-y-z vectors. Additionally, the controller 605 can be configured to differentiate between impact, motion, and machine vibration (such as vibration from normal operation). The controller 605 can combine information regarding motion and vibration to detect impact and differentiate impact from normal operation. The GTD 200 also can be configured to measure an internal temperature of the GTD 200.

The controller 605 may represent a single processing device, a multi-processing unit, or a distributed processing system. The controller 605 can utilize instructions stored in the memory 635 and connections to various other components, such as various transceivers, sensors, or batteries.

During operation, the controller 605 can store data related to the object to which it is attached in the memory 635. The controller 605 can therefore be configured to perform data logging, such as downloading high-resolution data locally. Additionally, the controller 605 can alter a timing of a report based on motion of the GTD 200, such as movement of the object to which the GTD 200 is attached. The GTD 200 can also store information related to vibration of the object to which the GTD 200 is attached. Accumulated vibration information can include data related to year-to-date, lifetime, and instant operation (this trip) vibrations. The GTD 200 can further measure the vibrations using the sensors and embed vibration information in messages reported to an operator or central facility. In some embodiments, the GTD 200 includes a vibration detection read switch configured to enable an operator to read vibration information via an external device.

The memory 635 may include any suitable volatile and/or non-volatile storage and retrieval device(s). For example, the memory 635 can include any electronic, magnetic, electromagnetic, optical, electro-optical, electro-mechanical, and/or other physical device(s) that can contain, store, communicate, propagate, or transmit information. The memory 635 can store data and instructions for use by the controller 605. Additionally, the memory 635 can store information related to the object to which the GTD 200 is attached, such as detected location, event history, maintenance history, emergency handling procedures, and so forth.

External devices and users can interact with the GTD 200 in any suitable manner. For example, the GTD 200 could communicate with a monitor, keyboard, mouse, or other input/output device. The GTD 200 could also communicate wirelessly with other devices or systems.

Figure 7:
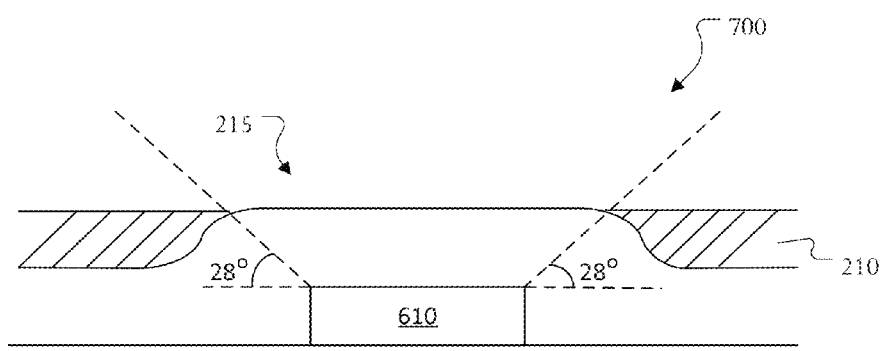
FIG. 7 illustrates an example signal focusing configuration of the global tracking device according to this disclosure.

FIG. 7 illustrates an example signal focusing configuration 700 of the global tracking device 200 according to this disclosure. As shown in FIG. 7, one or more long-range RF signals are focused into the transceiver 610 using this signal focusing configuration.

The signal focusing configuration 700 defines a relationship between a location of the transceiver 610 and edges of the hardened case 210. More specifically, the transceiver 610 is disposed at a location corresponding to the first window 215. For example, the transceiver 610 can be disposed at a location on the circuit board 535 that is centered beneath the first window 215. The transceiver 610 is also disposed such that an angle formed by an adjacent edge of the first window 215, the transceiver 610, and the circuit board 535 focuses RF energy towards the transceiver 610. In some embodiments, the angle formed by an adjacent edge of the first window 215, the transceiver 610, and the circuit board 535 is about 28°. The hardened case 210 therefore focuses RF energy towards the transceiver 610. The exact position of the transceiver 610 may vary as long as the relationship between the transceiver 610 and edges of the first window 215 is maintained.

Figure 8:
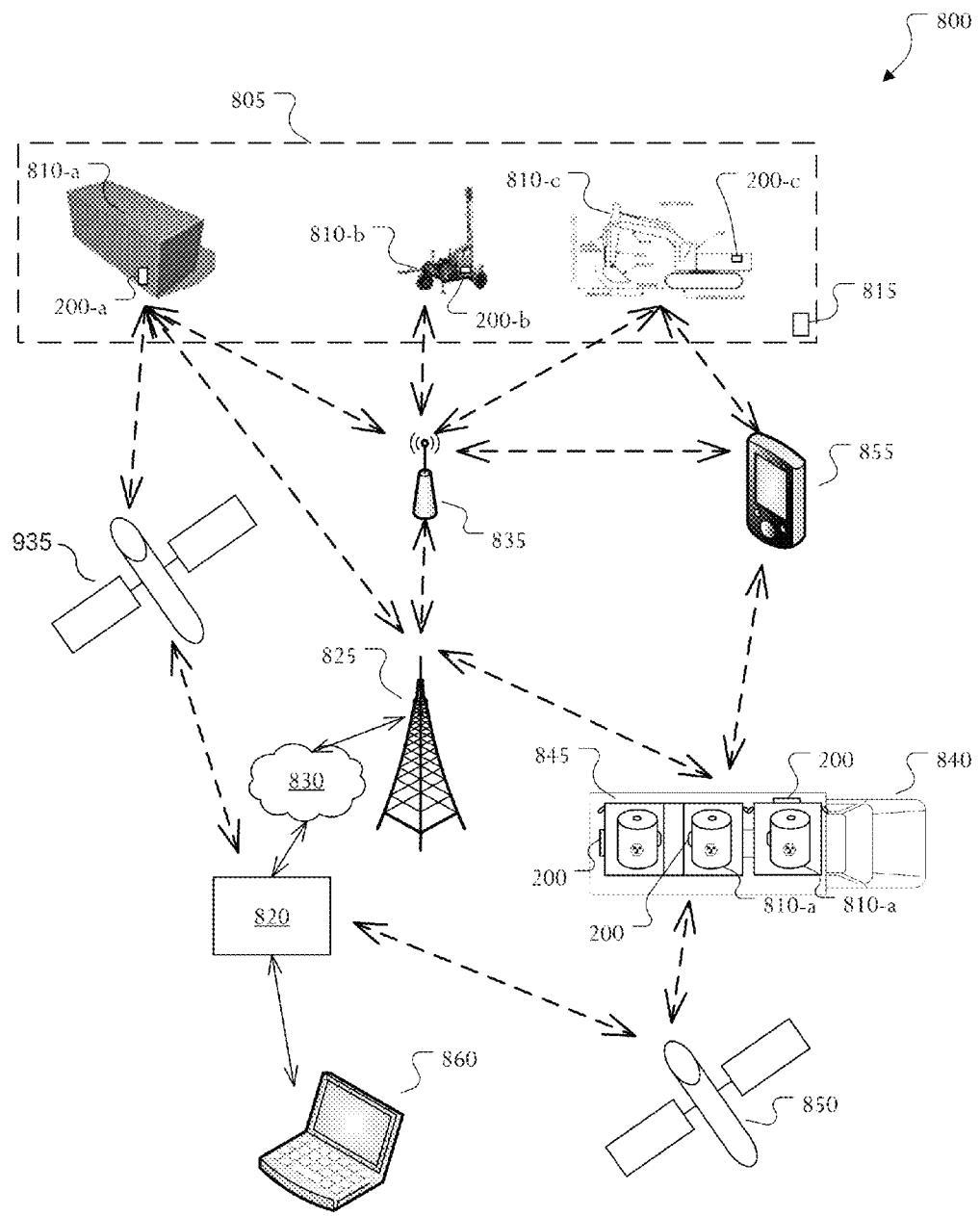
FIG. 8 illustrates an example global tracking and reporting system according to this disclosure.

FIG. 8 illustrates an example global tracking and reporting system 800 according to this disclosure. As shown in FIG. 8, an operation site 805 includes multiple pieces of equipment 810, such as storage containers 810-a, machinery 810-b, and construction equipment 810-c. The operation site 805 can represent any suitable location, such as an excavation site, a drilling site, an industrial facility, a manufacturing site, or the like. The operation site 805 can include any number of pieces of equipment.

Each piece of equipment here includes, is attached to, or is otherwise associated with a GTD 200. For example, a container 810-a is associated with a first GTD 200-a attached to a sidewall, either internally or externally. Among other things, the first GTD 200-a could store information about the container 810-a and one or more articles contained within the container 810-a. Additionally, the machinery 810-b and the construction equipment 810-c are associated with a second GTD 200-b and a third GTD 200-c, respectively. Each of these GTD 200-b and 200-c can store information regarding the respective item to which it is attached.

The operation site 805 can optionally include a transponder 815, such as an RFID transponder. The transponder 815 can be configured to transmit a location identifier (ID), read an identifier from an RFID transmitter, or both. The location identifier can include information regarding the operation site 805. For example, the GTD 200-a attached to the container 810-a can receive a location identifier from the transponder 815 as the GTD 200-a enters into communication proximity with the transponder 815. This could occur, for instance, when a transport truck delivers the container 810-a to the operation site 805 and the transponder 815 transmits the location identifier to the GTD 200-a. The first GTD 200-a can then transmit a message to a central facility 820. The message can include the location identifier and a container ID. In some embodiments, the message also includes information regarding the contents of the container 810-a. For example, the message may indicate that a specified container is located at a specified operation and contains specified equipment and material. If the GTD 200 is configured to do so, the message can also include an identifier uniquely associated with the contents of the container 810-a. In some embodiments, when the contents include a radioactive or other hazardous source, the message can include a reading from a radiation sensor or other sensor (in either the container 810-a or operation site 805). The GTDs 200-b and 200-c can also transmit messages to the central facility 820 about their associated machinery 810-b and construction equipment 810-c. Additionally, if a GTD is so configured, a message can include an identifier of other co-located GTD-enabled objects nearby.

In some embodiments, messages from the GTDs to the central facility 820 are transmitted using wireless cellular communications via one or more base stations 825 to the central facility 820. A base station 825 can be configured to transmit the messages to the central facility 820 via wireless communications or via a backhaul connection 830.

In other embodiments, messages can also be transmitted to one or more relay stations 835. A relay station 835 may be located at a regional office with a transceiver, or the relay station may be a standalone transceiver with appropriate logic necessary to transmit the messages.

In yet other embodiments, a vehicle 840 can transport equipment or materials, such as in one or more containers 810-a. The vehicle 840 could represent a truck, railcar, ship, plane, or other vehicle. The containers 810-*a* on the vehicle 840 are housed in an overpack 845, such as when the containers 810-*a* contain a radioactive material. The containers 810-*a* include a number of articles with corresponding information, such as IDs, stored in the memory of the attached GTDs 200. In some embodiments, the GTDs 200 on the containers 810-*a* transmit messages to the central facility 820 via one or more satellites 850. The overpack 845 can also transmit an overpack message, which includes information received from the GTDs 200 attached to the containers 810-*a*, to the central facility 820 via the satellite(s) 850. A transceiver on the vehicle 840 can further transmit messages or overpack messages to the central facility via the satellite(s) 850. Note, however, that the messages from the vehicle 840 can be sent in other ways, such as via the base station(s) 825 or relay station(s) 835.

In FIG. 8, at least one portable external device 855 is configured to communicate with various GTDs. The external device 855 can be any type of portable device adapted to transmit data to and receive data from one or more GTDs. The external device 855 could, for example, represent a cellular phone, a smartphone, a personal digital assistance, or a laptop computer.

In some embodiments, the external device 855 is adapted to query a GTD to obtain information about the object to which the GTD is attached, such as the container 810-*a*, machinery 810-*b*, or construction equipment 810-*c*. The external device 855 can also be adapted to program the GTD. For example, the external device 855 can be configured to allow a user to establish a periodic interval for reporting, upload or download maintenance history and comments, and upload or download emergency handling procedures.

The central facility 820 is configured to receive messages and overpack messages from the GTDs and other components at multiple locations. The central facility 820 can also be adapted to track the locations of each GTD, and as such the object to which each GTD 200 is attached, in a database. The central facility 820 can further be configured to report the locations, movement, and histories of each piece of equipment via a user interface 860, such as a computer terminal or website.

In some embodiments, the central facility 820 can generate information data records regarding the locations, movement, and histories of the equipment. For example, the central facility 820 can support a website located on a global communication network (GCN) (such as the web). The website can include the information data records. Accordingly, one or multiple users can be provided access to the location, movement, and history of each piece of equipment. In some embodiments, the website includes a graphical representation of the locations of the pieces of equipment 810. Also, in some embodiments, the website is configured to allow users to interact with the graphical representations. For example, a user may be able to select an icon representing a particular piece of equipment, and in response the website displays information corresponding to the selected equipment.

In some embodiments, the central facility 820 is also configured to send email notifications to multiple users. For example, the central facility 820 can be configured to send the notifications in response to an "alert" event occurring, at periodic intervals, or both. As a particular example, if a container experiences a collision as reported by its Gm 200 and/or is moved (transported), the central facility 820 can send an email alert to a predetermined list of users informing them that the equipment is being moved and/or may be damaged.

Figure 9:
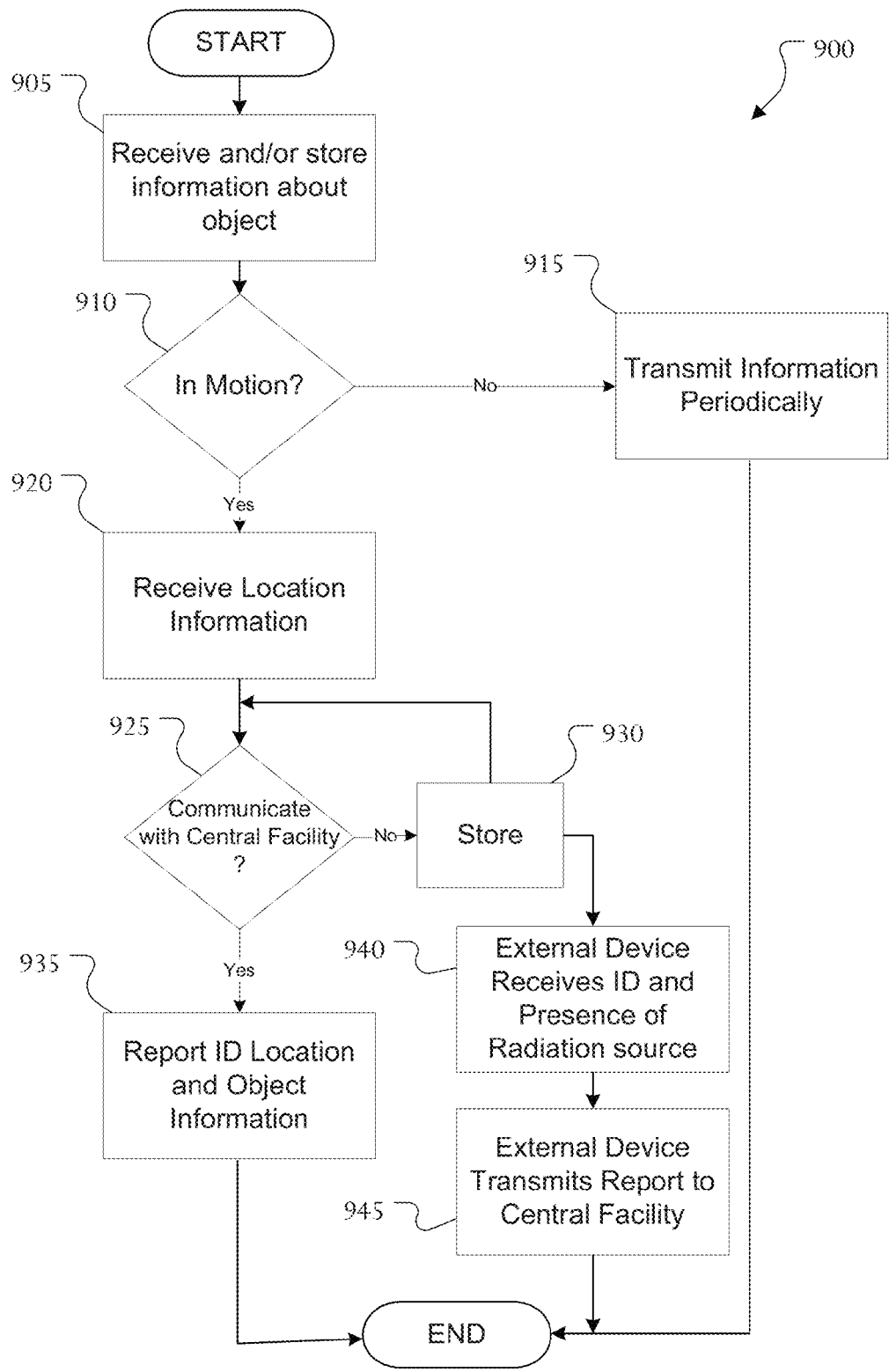
FIG. 9 illustrates an example flow diagram of operation of a global tracking device according to this disclosure.

FIG. 9 illustrates an example flow diagram 900 of operation of a global tracking device 200 according to this disclosure. In step 905, the GTD 200 receives and/or stores information about the object to which the GTD 200 is attached. For example, the GTD 200 can receive ID information, location information, maintenance history, operation history, manufacture history, hazardous material information, explosive information, radioactive material information, and so forth. As a particular example, the GTD 200 can use the GPS engine 615 to determine a location of the GTD 200, and the GTD 200 associates the location information to the object to which it is attached. The GTD 200 can store the information related to the object in its memory 635. In some embodiments, the GTD 200 receives and stores ID information that is associated with the object when the GTD 200 is first coupled to that object. The information can be received from an external device 855, via a BLE or other short-range wireless connection, or via long-range communications.

In step 910, the GTD 200 determines whether the object is in motion. If not, the GTD 200 transmits information periodically in step 915. If so, the GTD 200 receives location information at step 920. This can be done periodically (such as at specified intervals), when queried or instructed to receive the information, when the GTD 200 determines the motion has stopped, or a combination of these. The location information can represent any suitable information, such as GPS coordinates. The GTD 200 can receive timing information from a satellite or other external source during this time, or it can use its own internal clock.

In step 925, the GTD 200 seeks to establish a communication session with a central facility. The GTD 200 determines if a communication path is available (such as if cellular or satellite communications are possible). If no communication path is available, the GTD 200 creates and stores an object report in step 930. The object report can include an object identifier ("ID"), information regarding the object, and the geographic location of the object. The object ID can be an identifier that is uniquely associated to the object or to the GTD 200 attached to the object. Thereafter, the GTD 200 seeks to establish a communication session with the central facility at periodic intervals.

If GTD 200 is able to establish the communication with the central facility, the GTD 200 transmits a message in step 935. The message can include the object ID, information about the object, and the geographic location of the object. Additionally, the GTD 200 can transmit any stored hazardous material, explosive, or radioactive material reports.

In some embodiments, in step 940, an external device receives a transmission from the GTD 200. The external device can be a PDA, smartphone, laptop computer, portable terminal, or relay transmission device located in close proximity to the GTD 200. This can be done regardless of whether communications between the GTD 200 and the central facility are possible. Thereafter, the external device transmits the information received from the GTD 200 (such as the object report) to the central facility in step 945. The external device can include a geographic location of the external device when communicating with the central facility. For example, if the external device is a smartphone or other device with a GPS, the device can determine its location and include GPS coordinates with the information received from the GTD 200.

Figure 10:
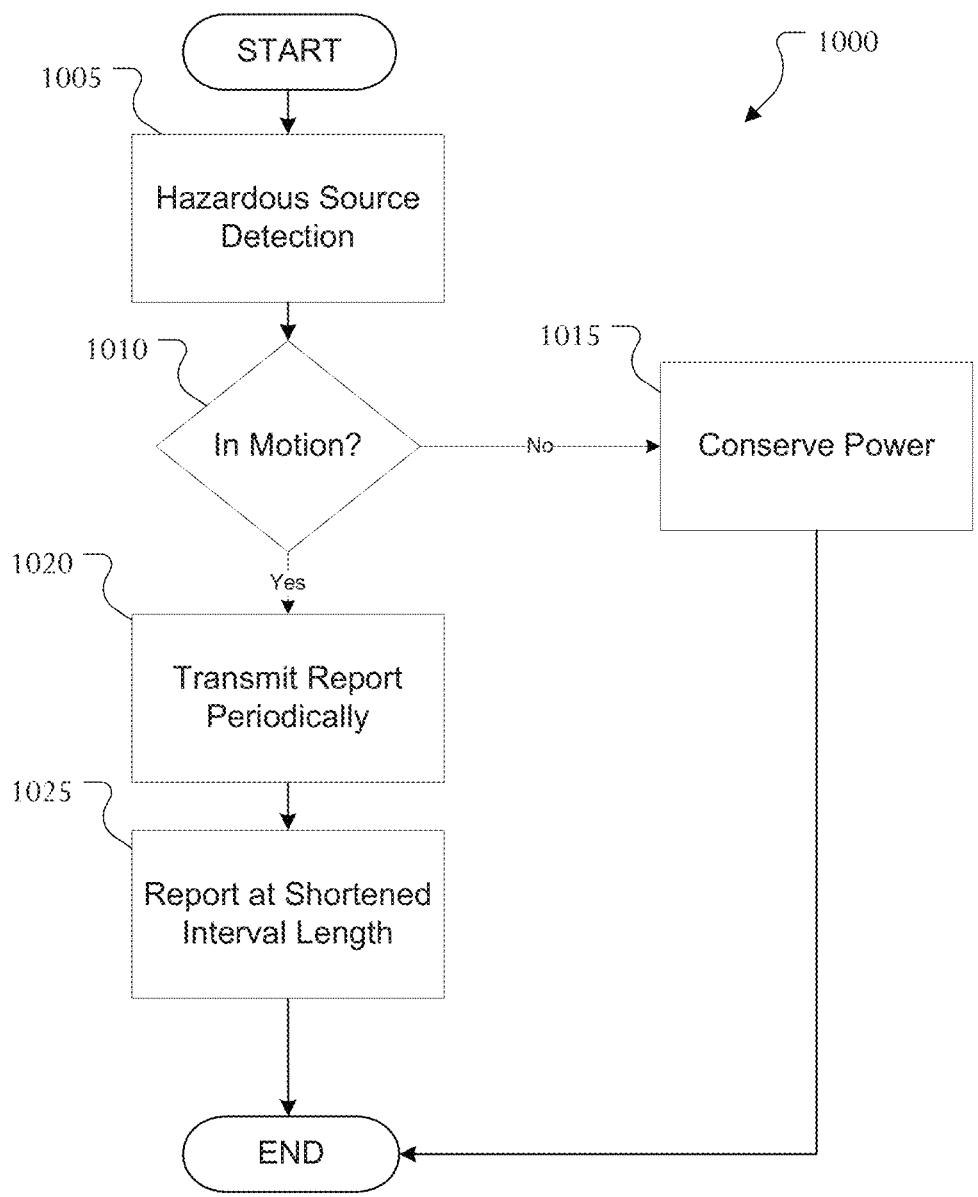
FIG. 10 illustrates an example flow diagram of a motion determination process according to this disclosure.

FIG. 10 illustrates an example flow diagram 1000 of a motion determination process according to this disclosure. In step 1005, the GTD 200 stores hazardous source information regarding an object to which it is attached. The information may have been previously stored or newly entered into a memory 635 of the GTD 200. If the GTD 200 is not in motion in step 1010, the GTD 200 determines that a power conservation mode should be invoked in step 1015. In some embodiments, the GTD 200 shuts down one or more components during this time, and the GTD 200 transmits the object report periodically. In a power conservation mode, the GTD 200 can remain asleep until motion is detected again. In some embodiments, the operator can manually awaken the GTD 200.

If the GTD 200 determines that the object to which it is attached is in motion in step 1010, the GTD 200 transmits an object report at periodic intervals (such as once every five seconds, every minute, or some other specified interval) in step 1020. In some embodiments, the GTD 200 adjusts the periodic interval at which the GTD 200 transmits the object report. For example, if the periodic interval was initially set at once every three minutes, the GTD 200 can adjust the periodic interval to once every five seconds. The object report is then transmitted at the shortened interval in step 1025.

Figure 11:
FIG. 11 illustrates data access elements for a global tracking device according this disclosure.

FIG. 11 illustrates data access elements for a global tracking device 200 according this disclosure. As shown in FIG. 11, the GTD 200 can include one or more data access elements disposed on a top side (e.g., a face) of the hardened case 210. The data access elements can include one or more of: a passive RFID device 1102 and a machine readable code, such as a linear, one dimensional (1-D), barcode 1104 and a two dimensional (2-D) 1106.

The linear barcode 1104 can be any type of linear (1-D) barcode 1104, such as a Universal Product Code (UPC), EAN code, QR code, or any other 1-D code that can be uniquely identified with the GTD 200. The 2-D barcode 1106 can include rectangles, dots, hexagons and other geometric patterns in two dimensions. The 2-D barcode 1106 can be any suitable 2-D code such as: a UPC code, EAN code, QR code, or any other scannable image that can be uniquely identified with the GTD 200. The 1-D barcode 1104 and 2-D barcode 1106 are configured to be scanned by a number of devices such as special optical scanners, smart-phones and other image reading devices with interpretive software configured to read the barcodes.

In certain embodiments, the GTD 200 is configured to provide data access using the RFID device 1102, which can be located within the hardened case, such as part of the processing circuitry 510 mounted or otherwise mounted to the circuit board 535. In certain embodiments, a sensor such as a BLE sensor, or any other sensor module configured to enable a wireless communication path between the GTD 200 and an external device 855, may be used in place of, or in addition to the RFID device 1102.

The GTD 200 can store data pertaining to identification information within the memory 635 of the GTD. Location or geographic information, maintenance history, operation history, explosive information, radioactive information, as well as any other type of information for the GTD 200, or item(s) to which the GTD is attached, can be stored in memory 635. For example, when attaching the GTD 200 to a piece of equipment, an operator can transfer data to the GTD 200 using the external device 855. Additionally, the GTD 200 can be associated with, a database or plurality of data records, of the piece of equipment. The data record can be stored at a remote location such as the central facility 820. The data record can include any information associated with the piece of equipment such as year-to-date information, lifetime operation metrics, and instant operation metrics. For example, the information can include: manufacturer, manufacture date, retailer, owner, operator, lease agreements, maintenance history, operating histories, parts order forms, serial numbers, operating instructions, hazardous materials information, governmental compliance information, shipping histories, operator comments and suggestions for operation, current location, past operating locations, operator requirements, and the like.

The GTD 200 is configured to provide the operator with data related to the equipment to which the GTD 200 is attached. The operator can access the data record of the equipment by scanning the 1-D barcode 1104 or 2-D barcode 1106. In certain embodiments, scanning different elements can provide different information. For example, the operator can scan the 1-D barcode 1104 to obtain information regarding the GTD 200 or the operator can scan the 2-D barcode 1106 to obtain information regarding the equipment to which the GTD 200 is attached.

When the operator scans one of the data access elements using the external device 855, an interactive display, such as a unique web page or a web application, is generated or initiated containing the data in the database. For example, the operator can use a smart-phone to scan the 2-D barcode 1106. The smart-phone can contain interpretive software configured to, in response to reading the 2-D barcode 1106, cause the smart-phone to launch a web-application. The web-application reads data in the database and generates a web-view on the smart-phone containing information related to the equipment to which the GTD 200 is attached. In certain embodiments, the data is retrieved from a remote location, such as the central facility 820. In certain embodiments, a portion of the data is retrieved from the memory 635 of the GTD 200. The web-page may be generated at the smart-phone or generated at the remote location and downloaded to the smart phone. The web-page can include any suitable display of data such as by using tool-bars, drop-down menus, images, icons, hyperlinks to associated or related content, hyperlinks to associated or related equipment, and text. In certain embodiments, the operator can query the database for specified items. In response to the query, a portion of the data in the database can be downloaded to the smart-phone, displayed on a display of the smart-phone or both. In certain embodiments, the operator can enter or add data, comments, or records to the database. For example, the operator can add comments regarding operation of the equipment, repairs made to the equipment, and the like. Thereafter, the comments, once stored in the database, are accessible for future queries. Because the data stored in the database potentially includes data from the "birth" of the equipment up until the moment the request for the data is received, the latest data is available on the web site or web application that is generated in response to scanning the data access elements.

Figure 12:
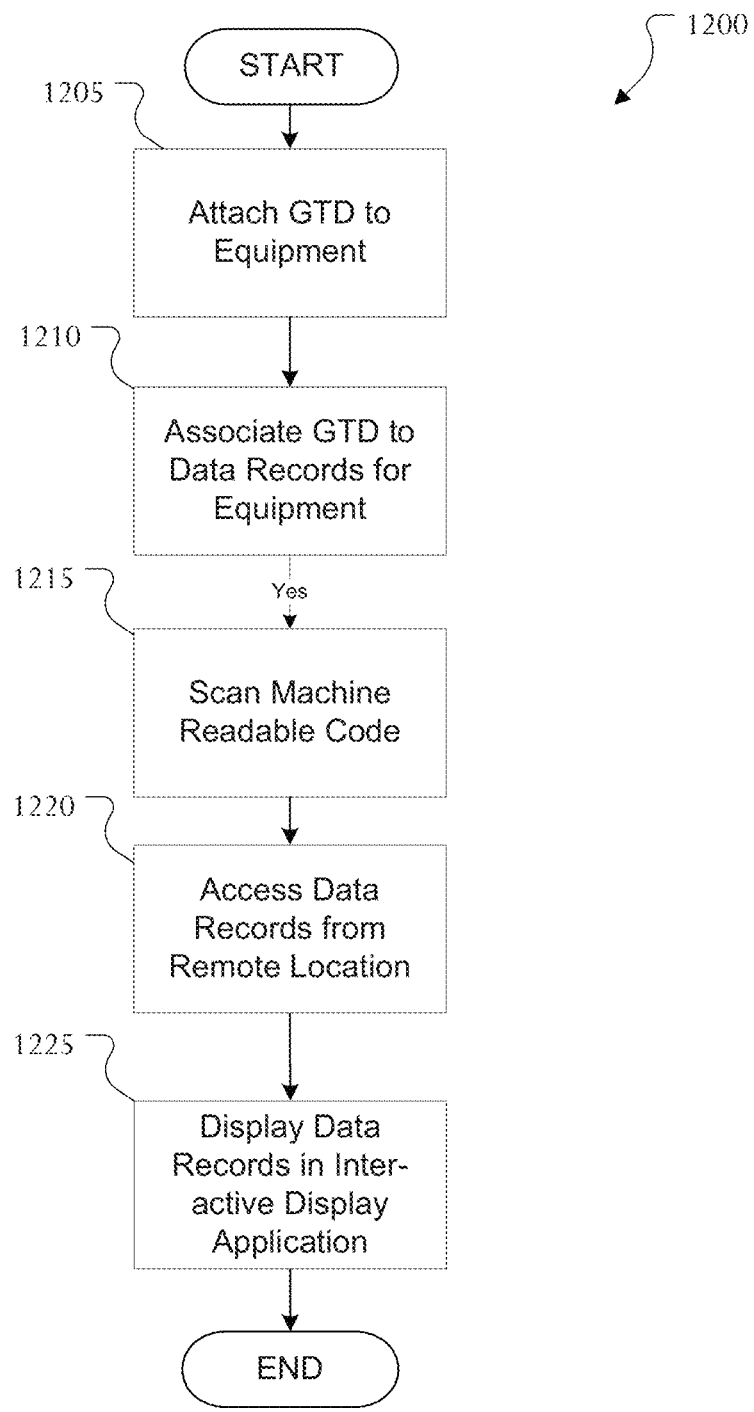
FIG. 12 illustrates an example flow diagram 1200 of a data access process according to this disclosure.

FIG. 12 illustrates an example flow diagram 1200 of a data access process according to this disclosure. In step 1205, the GTD 200 is attached to a piece of equipment. In step 1210, the GTD 200 is associated to a plurality of data records in a database containing information regarding the piece of equipment. The GTD 200 also can store a portion of the information regarding the equipment. Additionally, a portion of the data records may be stored in a database at the central facility 820 or other remote location. The GTD 200 is associated with the data records by associating a machine readable code, such as in a 1-D barcode 1104 or 2-D barcode 1106, with the data records in the database. Using an external device 855, such as a smart-phone, an operator scans the machine readable code in step 1215. In response to reading the machine readable code, the external device 855 accesses the database stored at the remote location in step 1220. In certain embodiments, the RFID device 1102 is associated with the data records and the operator accesses the data records by probing the RFID device 1102. A unique web-site is generated in the display of the external device 855 in step 1225. The web-site contains information from the database regarding the equipment to which the GTD 200 is attached. The web-site can include a plurality of fields to display information as well as provide the operator the ability to enter information into the database. The web-site further is configured to enable the operator to create queries to access selected portions of the data records associated with the equipment. The web-site also enables the operator to edit portions of the data record to add, change or delete specified information.

Although various features have been shown in the figures and described above, various changes may be made to the figures. For example, the size, shape, arrangement, and layout of components shown in FIGS. 2 through 8 and 11 are for illustration only. Each component could have any suitable size, shape, and dimensions, and multiple components could have any suitable arrangement and layout. Also, various components in FIGS. 2 through 8 could be combined, further subdivided, or omitted and additional components could be added according to particular needs. For instance, a system using GTDs could support only cellular or satellite communications. Further, each component in a device or system could be implemented using any suitable structure(s) for performing the described function(s). In addition, while FIGS. 9, 10 and 12 illustrate various series of steps, various steps in FIGS. 9, 10 and 12 could overlap, occur in parallel, occur multiple times, or occur in a different order.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    a hardened case configured to be removably coupled to an object, the hardened case comprising a data access element associated with status, instruction, and history information regarding the object, the data access element comprising one of: a one-dimensional barcode or a two-dimensional barcode,
    wherein the data access element is configured to cause an external device to populate an interactive display of the external device, the interactive display containing at least a portion of the status, instruction, and history information regarding the object,
    wherein the interactive display is configured to permit manipulation of at least the portion of the status, instruction, and history information regarding the object, and
    wherein manipulation of at least the portion of the status, instruction, and history information regarding the object comprises at least one of adding new information, deleting existing information, changing existing information, running a query to access selected portions of information, or running a search to access selected portions of information.

2. The apparatus of claim 1, wherein the status, instruction, and history information regarding the object comprises information related to year-to-date information, lifetime operation metrics, and instant operation metrics.

3. The apparatus of claim 1, wherein the interactive display is associated with a website configured to enable an operator to display specified portions of the information.

4. The apparatus of claim 1, wherein the interactive display is associated with a website configured to enable the operator to edit the status, instruction, and history information regarding the object.

5. The apparatus of claim 1, wherein at least a portion of the status, instruction, and history information regarding the object is stored at a remote location.

6. The apparatus of claim 1, wherein the data access element comprises a linear portion associated with information regarding the apparatus and a two-dimensional portion associated with the status, instruction, and history information regarding the object.

7. A system comprising:
    a global tracking device configured to couple to an object of a plurality of objects, the global tracking device comprising:
        a hardened case configured to protect a circuit board and configured to be removably coupled to the object, the hardened case comprising a data access element associated with status, instruction, and history information regarding the object, the data access element comprising one of: a one-dimensional barcode or a two-dimensional barcode, and
        a memory configured to store a first portion of the status, instruction, and history information regarding the object, wherein the data access element is configured to cause an external device to populate an interactive display of the external device, the interactive display containing at least a portion of the status, instruction, and history information regarding the object, wherein the interactive display is configured to permit manipulation of at least the portion of the status, instruction, and history information regarding the object, and wherein manipulation of at least the portion of the status, instruction, and history information regarding the object comprises at least one of adding new information, deleting existing information, changing existing information, running a query to access selected portions of information, or running a search to access selected portions of information; and
    a central facility configured to communicate with the global tracking device via a satellite communication.

8. The system of claim 7, wherein the status, instruction, and history information regarding the object comprises information related to year-to-date information, lifetime operation metrics, and instant operation metrics.

9. The system of claim 7, wherein the interactive display is associated with a website configured to enable an operator to display specified portions of the status, instruction, and history information.

10. The system of claim 7, wherein the interactive display is associated with a website configured to enable the operator to edit the status, instruction, and history information regarding the object.

11. The system of claim 7, wherein at least a portion of the status, instruction, and history information regarding the object is stored at the central facility.

12. The system of claim 7, wherein the data access element comprises a linear portion associated with information regarding the apparatus and a two-dimensional portion associated with the status, instruction, and history information regarding the object.

13. The system of claim 7, wherein the external device comprises one of: a smart-phone, a portable laptop computer, and a barcode reader.

14. A method comprising:
associating a tracking device with status, instruction, and history information regarding an object to which the tracking device is coupled;
scanning, by an external device, a data access element disposed on a face of the tracking device, the data access element comprising one of: a one-dimensional barcode or a two-dimensional barcode;
generating, in response to scanning the data access element, an interactive display of the external device, the interactive display containing the status, instruction, and history information regarding the object, wherein the interactive display is configured to permit manipulation of at least the portion of the status, instruction, and history information regarding the object, and wherein manipulation of at least the portion of the status, instruction, and history information regarding the object comprises at least one of adding new information, deleting existing information, changing existing information, running a query to access selected portions of information, or running a search to access selected portions of information.

15. The method system of claim 14, wherein the status, instruction, and history information regarding the object comprises information related to year-to-date information, lifetime operation metrics, and instant operation metrics.

16. The method of claim 14, wherein the interactive display is associated with a website configured to enable an operator to at least one of: edit the status, instruction, and history information; and display specified portions of the status, instruction, and history information.

17. The system of claim 14, wherein generating further comprises retrieving at least a portion of the status, instruction, and history information regarding the object from a remote location.

18. The system of claim 14, wherein the external device comprises one of: a smart-phone, a portable laptop computer, and a barcode reader.

* * * * *